United States Patent
Yue et al.

(10) Patent No.: US 11,862,982 B2
(45) Date of Patent: Jan. 2, 2024

(54) NETWORKED CONTROL METHOD FOR PRIMARY FREQUENCY REGULATION OF NEW ENERGY POWER STATION

(71) Applicants: NANJING UNIVERSITY OF POSTS AND TELECOMMUNICATIONS, Jiangsu (CN); STATE GRID ELECTRIC POWER RESEARCH INSTITUTE CO. LTD, Jiangsu (CN)

(72) Inventors: Dong Yue, Jiangsu (CN); Chunxia Dou, Jiangsu (CN); Zhijun Zhang, Jiangsu (CN); Xiaohua Ding, Jiangsu (CN); Jianbo Luo, Jiangsu (CN); Yanman Li, Jiangsu (CN); Kun Huang, Jiangsu (CN); Tao Han, Jiangsu (CN)

(73) Assignees: NANJING UNIVERSITY OF POSTS AND TELECOMMUNICATIONS, Jiangsu (CN); STATE GRID ELECTRIC POWER RESEARCH INSTITUTE CO., LTD, Jiangsu (CN)

( * ) Notice: Subject to any disclaimer, the term of this patent is extended or adjusted under 35 U.S.C. 154(b) by 0 days.

(21) Appl. No.: 17/921,111

(22) PCT Filed: Aug. 2, 2021

(86) PCT No.: PCT/CN2021/109974
§ 371 (c)(1),
(2) Date: Oct. 24, 2022

(87) PCT Pub. No.: WO2022/217788
PCT Pub. Date: Oct. 20, 2022

(65) Prior Publication Data
US 2023/0291207 A1    Sep. 14, 2023

(30) Foreign Application Priority Data
Apr. 16, 2021 (CN) .......................... 202110413774.7

(51) Int. Cl.
*H02J 3/38* (2006.01)
*G05B 19/042* (2006.01)

(52) U.S. Cl.
CPC ............ *H02J 3/381* (2013.01); *G05B 19/042* (2013.01); *H02J 2203/20* (2020.01); *H02J 2300/24* (2020.01)

(58) Field of Classification Search
CPC .... H02J 3/381; H02J 2203/20; H02J 2300/24; G05B 19/042
See application file for complete search history.

(56) References Cited

FOREIGN PATENT DOCUMENTS

CN        106300394 A        1/2017

OTHER PUBLICATIONS

CNIPA, Notification of a First Office Action for CN202110413774.7, dated Aug. 25, 2021.

(Continued)

*Primary Examiner* — Charles Cai
(74) *Attorney, Agent, or Firm* — Zhigang Ma

(57) ABSTRACT

A networked control method for primary frequency regulation of a new energy power station based on a source-grid-load-storage networked cloud decision control system platform comprises: determining, according to historical operating data of a new energy power station, primary frequency regulation predictive values of power generation units of the new energy power station; determining, according to the primary frequency regulation predictive values, optimal control sequences of inverters of the power generation units at different times based on a pre-established inverter active power model, wherein the optimal control sequences comprise multiple control quantities of active power of the inverters; marking the optimal control sequences at the different times with time scales, sending the optimal control sequences to executing devices of the power (Continued)

generation units, receiving the optimal control sequences, and determining whether to store or not store the optimal control sequences; and determining the control quantities to be executed.

9 Claims, 2 Drawing Sheets

(56) References Cited

OTHER PUBLICATIONS

Nanjing University of Posts and Telecommunications, State Grid Electric Power Research Institute Co., Ltd (Applicants), Reply to Notification of a First Office Action for CN202110413774.7, w/ replacement claims, Aug. 27, 2021.
Nanjing University of Posts and Telecommunications, State Grid Electric Power Research Institute Co., Ltd (Applicants), Supplemental Reply to Notification of a First Office Action for CN202110413774.7, w/ (allowed) replacement claims, Sep. 2, 2021.
CNIPA, Notification to grant patent right for invention in CN202110413774.7, dated Sep. 13, 2021.

NETWORKED CONTROL METHOD FOR PRIMARY FREQUENCY REGULATION OF NEW ENERGY POWER STATION

FIELD

The invention belongs to the field of intelligent power grid control, and particularly relates to a networked control method for primary frequency regulation of a new energy power station.

BACKGROUND

In recent years, new energy for new energy power generation has developed rapidly worldwide. Since 2015, the installed capacity of grid-connected photovoltaic power generation in China has ranked first throughout the world and is rising quickly. However, the use of a huge number of power electronic devices will gradually lead to a low inertia of the power system, which arouses attention to the influence of the low inertia on the dynamic security of system frequency and increases operating pressure of the power grid. At present new energy power stations participate in primary frequency regulation by issuing a frequency regulation instruction; however, the frequency regulation precision is poor, the frequency regulation speed is low, and the success rate of primary frequency regulation is drastically decreased due to aging of communication devices of part of new energy power stations.

SUMMARY

The objective of the invention is to provide a networked control method for primary frequency regulation of a new energy power station to solve the problems that existing methods for primary frequency regulation of new energy power stations are poor in frequency regulation precision and low in frequency regulation speed and the success rate of primary frequency regulation of the new energy power stations is low due to aging of communication devices of part of the new energy power stations.

To solve the above-mentioned technical problems, the invention provides a networked control method for primary frequency regulation of a new energy power station, comprising:

Determining, according to historical operating data of a new energy power station, primary frequency regulation predictive values of power generation units of the new energy power station;

Determining, according to the primary frequency regulation predictive values, optimal control sequences of inverters of the power generation units at different times based on a pre-established inverter active power model, wherein the optimal control sequences comprise multiple control quantities of active power of the inverters;

Marking the optimal control sequences at the different times with time scales, sending the optimal control sequences to executing devices of the power generation units at the corresponding times, receiving the optimal control sequences by the executing, devices of the power generation units, and determining whether to store or not store the optimal control sequences according to the time scales; and Determining, by the executing devices of the power generation units, the control quantities to be executed according to optimal control sequences received and stored in the executing devices and the time scales of the optimal control sequences, so as to realize predictive compensation of a delay of a communication network.

Further, the historical operating data comprises one or more of historical active power data in at least 24 hours, light intensity data in at least 24 hours, and wind velocity data in at least 24 hours.

Further, the inverter active power model is established through the following steps:

Establishing an equivalent mathematical model of active power output by the inverters in a PQ mode:

$$\begin{cases} \Delta P_{ref} = \dfrac{1}{1+sT_d}\Delta P_{ref}^* \\ \Delta i_{od} = \dfrac{1}{1+sT_{in}^p}\left(k_p^p + \dfrac{k_i^p}{s}\right)(\Delta P_{ref} - \Delta P_{dg}) \\ \Delta P_{dg} = \dfrac{3u_{od}}{2}\Delta i_{od} \\ \Delta P_{int} = \dfrac{\Delta P_{ref} - \Delta P_{dg}}{s} \end{cases}$$

Wherein, $\Delta P_{ref}^*$ is a difference between reference power and present power of the inverters, $\Delta P_{ref}$ is a difference between actual reference power and the present power of the inverters, $T_d$ is a delay from receipt of a control instruction by the inverters to execution of the control instruction by the inverters, $\Delta i_{od}$ is a difference between a d-axis current component at a present time and a d-axis current component at a previous time of the inverters, $T_{in}^p$ is a time constant of an inner current loop of the active power, $k_p^p$ and $k_i^p$ are a proportional coefficient and an integral coefficient of an outer power loop PI controller respectively, $\Delta P_{dg}$ is a difference between output power at the present time and output power at the previous time of the inverters, $u_{od}$ is a d-axis component of output port voltage of the inverters, $\Delta P_{int}$ is an integral of a difference between $\Delta P_{ref}$ and $\Delta P_{dg}$, and s is a Laplace operator;

Establishing state-space model of the active power output by the inverters based on the equivalent mathematical model:

$$\Delta \dot{x}_c^P = A_c^P \Delta x_c^P + B_c^P \Delta u_c^P$$

Wherein, $\Delta x_c^P = [\Delta P_{dg} \Delta P_{int} \Delta i_{od} \Delta P_{ref}]^T$ $$A_c^P = \begin{bmatrix} 0 & 0 & \dfrac{3}{2}u_{od} & 0 \\ -1 & 0 & 0 & 1 \\ -\dfrac{k_p^p}{T_{in}^p} & \dfrac{k_i^p}{T_{in}^p} & -\dfrac{1}{T_{in}^p} & \dfrac{k_p^p}{T_{in}^p} \\ -\dfrac{1}{T_d} & 0 & 0 & 0 \end{bmatrix}, B_c^P = \begin{bmatrix} 0 \\ 0 \\ 0 \\ -\dfrac{1}{T_d} \end{bmatrix}, \Delta u_c^P = [\Delta P_{ref}^*]$$

Discretizing $\Delta \dot{x}_c^P = A_c^P \Delta x_c^P + B_c^P \Delta u_c^P$ to obtain a mathematical model of the active power output by the inverters in a discrete time:

$$x(k+1) = Ax(k) + Bu(k)$$

Wherein, $x(k) = [\Delta P_{dg}(k) \Delta P_{int}(k) \Delta i_{od}(k) \Delta P_{ref}(k)]^T$, $\Delta P_{dg}(k)$ is a difference between output power at a time k and output power at a previous time of the inverters, $\Delta i_{od}(k)$ is a difference between a d-axis current component at the time k and the d-axis current component at the previous time of the inverters, $\Delta P_{ref}(k)$ is a difference between the actual reference power and the power at the time k of the inverters, $\Delta P_{int}(k)$ is an integral of a difference between $\Delta P_{ref}(k)$ and $\Delta P_{dg}(k)$, $u(k)=[\Delta P_{ref}^*(k)]$, $\Delta P_{ref}^*(k)$ is a difference between the reference power and the power at the time k of the inverters, $$A = e^{A_c^p T_p}, B = \int_0^{T_p} e^{A_c^p \tau} B_c^p d\tau,$$

and $T_p$ is a sampling time.

Further, determining, according to the primary frequency regulation predictive values, optimal control sequences of inverters of the power generation units at different times based on a pre-established inverter active power model, comprises:

When primary frequency regulation is started under a condition where a system frequency is lower than a rated frequency, determining, based on the inverter active power model, the optimal control sequences of the inverters of the power generation units at different times by means of an objective function for predictive control, wherein the objective function for predictive control is expressed as:

$$\min \sum_{j=1}^{N_p} \sum_{i=1}^{N} \lambda_i(k) \Phi_i(k+j|k)$$

Wherein, $N_p$ is a predictive domain length, N is the number of the power generation units of the new energy power station, $\lambda_i(k)$ is a weight coefficient of an $i^{th}$ power generation unit, $\Phi_i(k)=-b_i\Delta P_i(k), b_i=\{0,1\}$ is a cost function of the $i^{th}$ power generation unit, and $\Delta P_i(k)$ is a power variation of the $i^{th}$ power generation unit at the time k with respect to a time k−1; $\Phi_i(k+j|k)$ represents a $\Phi_i$ value at a time k+j predicted at the time k;

Constraints of the objective function are:

$$\lambda_i(k) = C_i(k) \frac{\Delta P_i^{max}}{\Delta P_{total}}$$

$$\Delta P_{total} = \sum_{i=1}^{N} \Delta P_i^{max}$$

$$\sum_{i=1}^{N} P_i(k) = \Delta P$$

$$\Delta P = K \Delta f$$

$$\Delta P_i^{min} \le \Delta P_i(k) \le \Delta P_i^{max}, i = 1, 2 \ldots N$$

$$x(k+1) = Ax(k) + Bu(k)$$

Wherein, $C_i(k)$ is a confidence of the $i^{th}$ power generation unit at the time k, and an initial value of $C_i(k)$ is 1; $\Delta P_i^{max}$ and $\Delta P_i^{min}$ are an upper limit and a lower limit of the primary frequency regulation predictive values respectively, $\Delta P$ is total power required for the new energy power station to participate in primary frequency regulation, $\Delta P_{total}$ is a total predictive value for the new energy power station to participate in primary frequency regulation, $P_i(k)$ is active power of the $i^{th}$ power generation unit at the time k, $\Delta f$ is a system frequency deviation, and K is a primary frequency regulation coefficient of the new energy power station; $x(k+1)=Ax(k)+Bu(k)$ is the active power model of the inverters in the discrete time;

The optimal control sequences are:

$$u^*(k)=[\Delta P_{ref}^*(k|k), \Delta P_{ref}^*(k+1|k), \ldots, \Delta P_{ref}^*(k+N_c|k)]$$

Wherein, $u^*(k)$ is the optimal control sequence at the time k, $N_c$ a control domain length, $\Delta P_{ref}^*(k+i|k), i=1, 2, \ldots N_c$ is a control quantity at a time k+i of the inverters predicted at the time k, and $\Delta P_{ref}^*(k|k)$ is a control quantity at the time k of the inverters.

Further, receiving the optimal control sequences by the executing devices of the power generation units and determining whether to store or not store the optimal control sequences according to the time scales, comprise:

If the time scales of the optimal control sequences received by the executing devices of the power generation units are less than or equal to the time scales of stored optimal control sequences stored in the executing devices, not storing the received optimal control sequences;

Otherwise storing the received optimal control sequences.

Further, determining, by the executing devices of the power generation units, the control quantities to be executed according to optimal control sequences received and stored in the executing devices and the time scales of the optimal control sequences, comprises:

If the time scale of the optimal control sequence received by the executing devices of the power generation units at the present time is identical with the time scale of the optimal control sequence stored in the executing devices, executing a first control quantity in the optimal control sequence stored in the executing devices.

Further, determining, by the executing devices of the power generation units, the control quantities to be executed according to optimal control sequences received and stored in the executing devices and the time scales of the optimal control sequences, comprises:

Assume an optimal control sequence packet stored in the executing device of the $i^{th}$ power generation unit at the present time k is:

$$u_i^*(k_i)=[\Delta P_{ref,i}^*(k_i|k_i), \Delta P_{ref,i}^*(k_i+1|k_i), \ldots, \Delta P_{ref,i}^*(k_i+N_c|k_i)]$$

Wherein, $k_i$ is a time scale of the optimal control sequence packet stored in the executing device in the $i^{th}$ power generation unit at the present time k, $\Delta P_{ref,i}^*(k_i+i|k_i), i=1, 2, \ldots N_c$ is a control quantity at a time $k_i+i$ of the $i^{th}$ inverter predicted at a time $k_i$, and $\Delta P_{ref,i}^*(k_i|k_i)$ is a control quantity at the time $k_i$ of the $i^{th}$ inverter;

If the executing device of the $i^{th}$ power generation unit does not receive an optimal control sequence packet at the present time k, executing a control quantity $\Delta P_{ref,i}^*(k|k_i)$, wherein $\Delta P_{ref,i}^*(k|k_i)$ is the control quantity at the present time k of the $i^{th}$ inverter predicted at the time $k_i$; or If the time scale of the optimal control sequence packet received by the executing device of the $i^{th}$ power generation unit at the present time k is less than $k_i$, executing the control quantity $\Delta P_{ref,i}^*(k|k_i)$.

Further, determining, by the executing devices of the power generation units, the control quantities to be executed according to optimal control sequences received and stored in the executing devices and the time scales of the optimal control sequences, further comprises:

Assume an optimal control sequence packet $u_i^*(k_r)$ received by in the executing device of the $i^{th}$ power generation unit at the present time k is:

$u_i^*(k_r)=[\Delta P_{ref,i}^*(k_r|k_r), \Delta P_{ref,i}^*(k_r+1|k_r), \ldots, \Delta P_{ref,i}^*(k_r+N_c|k_r)]$, wherein $k_r$ is a time scale of the optimal control sequence packet $u_i^*(k_r)$ received by in the executing device of the $i^{th}$ power generation unit at the present time k, $\Delta P_{ref,i}^*(k_r+i|k_r)$, i=1, 2, ... $N_c$ is a control quantity at a time $k_r$+i of the $i^{th}$ inverter predicted at a time $k_r$, and $\Delta P_{ref,i}^*(k_r|k_r)$ is a control quantity at the time $k_r$ of the $i^{th}$ inverter;

If the time scale $k_r$ of the optimal control sequence packet received by the executing device of the $i^{th}$ power generation unit at the present time k is greater than $k_j$, executing a control quantity $\Delta P_{ref,i}^*(k|k_r)$, wherein $\Delta P_{ref,i}^*(k|k_r)$ is the control quantity at the present time k of the $i^{th}$ inverter predicted at the time $k_r$.

Further, determining, according to the primary frequency regulation predictive values, optimal control sequences of inverters of the power generation units at different times based on a pre-established inverter active power model, further comprises:

Determining, according to the primary frequency regulation predictive values, a primary frequency regulation power allocation result of the power generation units based on the pre-established inverter active power model, adjusting the primary frequency regulation power allocation result according to a preset confidence function, and determining the optimal control sequences of the inverters of the power generation units at different times according to the adjusted primary frequency regulation power allocation result.

Further, a mathematical expression of the confidence function is:

$$C_i(k+1) = 1 - \frac{e_i(k)}{P_i^*(k)}, i = 1, 2, \ldots N$$

Wherein, $C_i(k+1)$ is a confidence function at a time k+1, $P_i^*(k)$ is a power reference value at a time k of an $i^{th}$ power generation unit, and $e_i(k)=|P_i(k)-P_i^*(k)|\delta$ is a power deviation function at the time k of the $i^{th}$ power generation unit, and is defined as:

$$|P_i(k) - P_i^*(k)|_\delta = \begin{cases} |P_i(k) - P_i^*(k)|, & |P_i(k) - P_i^*(k)| > \delta \\ 0, & |P_i(k) - P_i^*(k)| <= \delta \end{cases}$$

Wherein, $\delta$ is a set threshold for preventing a confidence decrease in presence of normal power fluctuations, and $P_i(k)$ is active power of the $i^{th}$ power generation unit at the time k. Compared with the prior art, the invention has the following beneficial technical effects.

The networked control method for primary frequency regulation of a new energy power station provided by the invention can predict the frequency regulation potential of the new energy power station based on a short-term real-time prediction algorithm, thus solving the problem of poor primary frequency regulation accuracy caused by uncertainties and fluctuations of the active power of new energy. In addition, during real-time power allocation of the new energy power station participating in primary frequency regulation, a corresponding optimization objective function is designed by taking into account the start-up cost of the power generation units of the new energy power station, so that the problems of low response speed, poor frequency regulation precision and network communication delay of primary frequency regulation in actual projects are solved, and it is ensured that the new energy power station participates in primary frequency regulation economically. Moreover, the output of each power generation unit of the new energy power station for primary frequency regulation is corrected by means of a dynamic weight coefficient based on a confidence function, so the problem of limited power regulation and faults of part of the power generation units of the new energy power station is effectively solved.

DETAILED DESCRIPTION

The invention will be further described below in conjunction with specific embodiments. The following embodiments are merely used to more clearly explain the technical solutions of the invention, and should not be construed as limiting the protection scope of the invention.

As mentioned above, existing methods for primary frequency regulation of new energy power stations have the problems of poor frequency regulation precision, low frequency regulation speed, and low success rate of primary frequency regulation of the new energy power stations due to aging of communication devices of part of the new energy power stations.

To solve the aforementioned problems, the invention provides a networked control method for primary frequency regulation of a new energy power station, which starts primary frequency regulation when a system frequency is out of a primary frequency regulation dead zone, so as to maintain the frequency of a power grid stable. The method predicts the primary frequency regulation potential of the new energy power station through a prediction algorithm based on a source-grid-load-storage networked cloud decision control system platform, and designs, by taking into account of generating costs of units of the new energy power station, an online rolling optimization method based on model predictive control to allocate primary frequency regulation power of the power generation units of the new energy power station.

Figure 1:
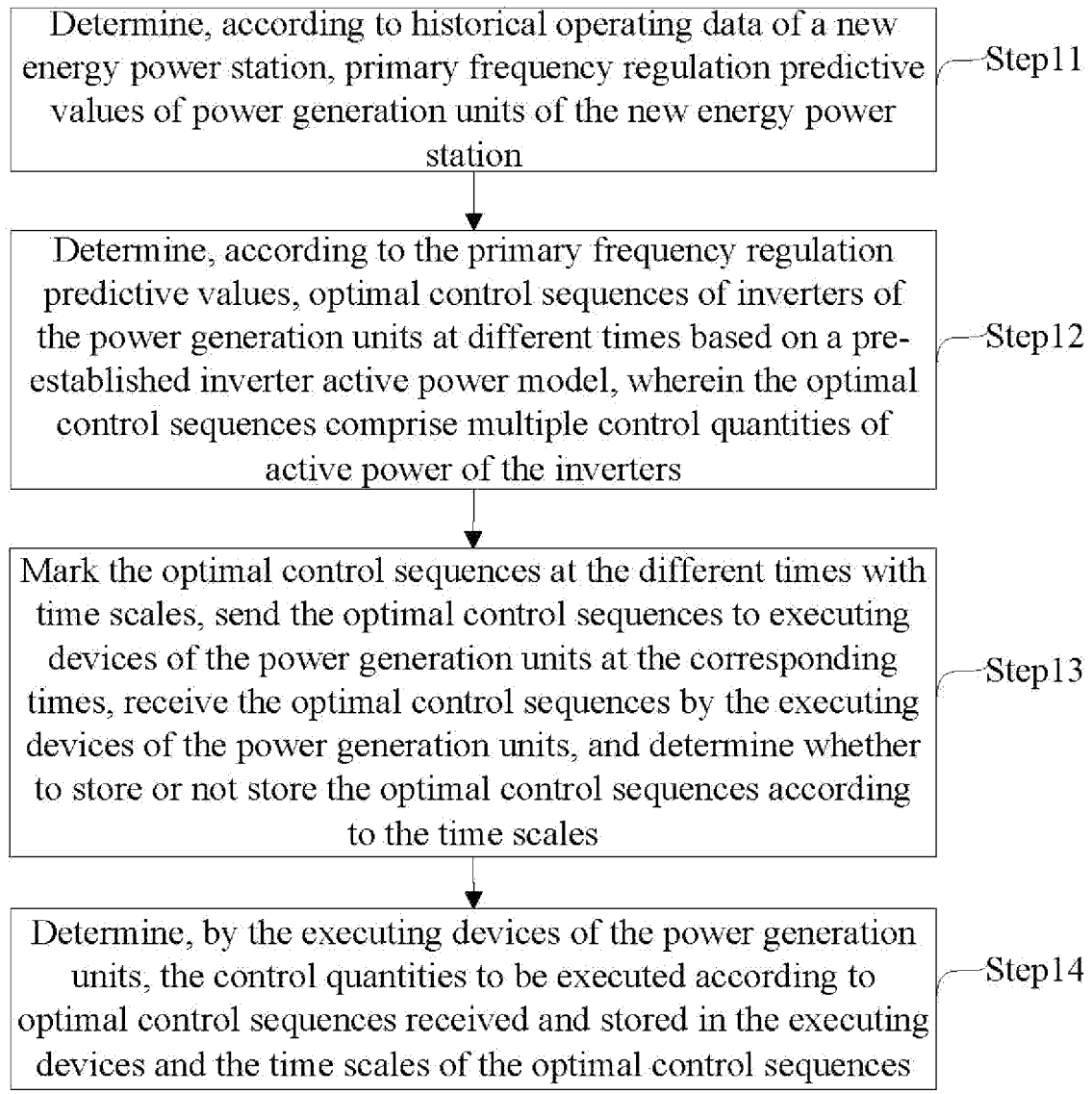
FIG. 1 is a flow diagram of a networked control method for primary frequency regulation of a new energy power station according to one embodiment of the invention.

FIG. 1 illustrates a flow diagram of a networked control method for primary frequency regulation of a new energy power station according to one embodiment of the invention. As shown in FIG. 1, the networked control method for primary frequency regulation of a new energy power station comprises at least the following steps:

Step 11, primary frequency regulation predictive values of power generation units of a new energy power station are determined according to historical operating data of the new energy power station.

In different embodiments, the primary frequency regulation predictive values of the power generation units may be determined in different specific ways. For example, in one embodiment, the primary frequency regulation potential of the power generation units may be predicted through a least squares support vector machine based on historical operating data of the new energy power station. This specification has no limitation in the specific ways of determining the primary frequency regulation predictive values.

In one embodiment, the historical operating data comprises one or more of historical active power data in at least 24 hours, light intensity data in at least 24 hours, and wind velocity data in at least 24 hours.

Step 12, according to the primary frequency regulation predictive values, optimal control sequences of inverters of the power generation units at different times are determined through an online rolling optimization method based on a pre-established inverter active power model, wherein the optimal control sequences comprise multiple control quantities of active power of the inverters.

Figure 2:
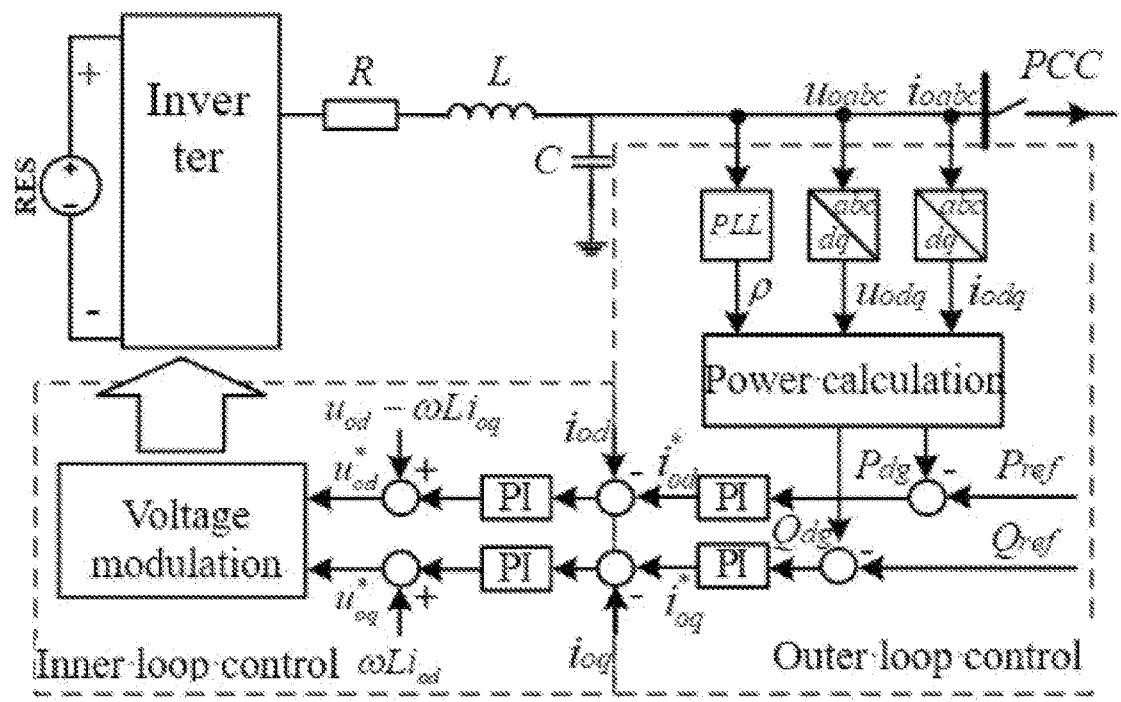
FIG. 2 is a schematic diagram of a control loop of inverters of power generation units of the new energy power station in a PQ mode according to the invention.

Specifically, on one embodiment, the units of the new energy power station transmit power to, a busbar through inverters, and to ensure that the power of the inverters is adjustable during primary frequency regulation, the inverters should operate in a PQ mode. In one example, an equivalent mathematical model of the inverters in the PQ mode may be established to obtain operating properties of the units of the new energy power station. As shown in FIG. 2, a control loop of the inverters in the PQ mode is composed of an outer power loop and an inner current loop on the dq coordinate axes, and without regard to disturbance on the q coordinate axes, active power and reactive power output by the inverters may be calculated according to formula (1):

$$\begin{cases} P_{dg} = \frac{3}{2} u_{od} \cdot i_{od} \\ Q_{dg} = -\frac{3}{2} u_{od} \cdot i_{oq} \end{cases} \quad (1)$$

In formula (1), $u_{od}$ is a d-axis component of output port voltage of the inverters, $i_{od}$ and $i_{oq}$ are d-axis component and q-axis component of output port current of the inverters respectively, and $P_{dg}$ and $Q_{dg}$ are the active power and reactive power output by the inverters respectively.

Figure 3:
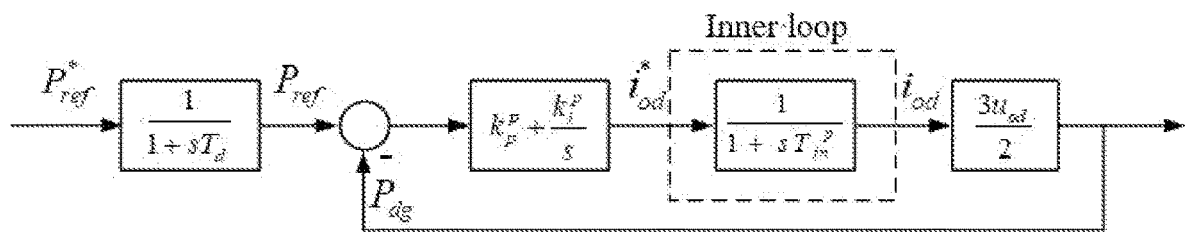
FIG. 3 illustrates an equivalent transfer function of the control loop of the inverters of the power generation units of the new energy power station in the PQ mode according to the invention.

As shown in FIG. 3, a delay from receipt of a control instruction by the inverters to execution of the control instruction by the inverters may be equivalent to a one-order inertia link, and is represented by a time constant $T_d$. Time constants $T_{in}^p$ and $T_{in}^q$ are used to represent dynamic response properties of the inner current loop. So, in one example, an equivalent mathematical model of the active power output by the inverters of the new energy power station in the PQ mode may be expressed as:

$$\begin{cases} \Delta P_{ref} = \frac{1}{1 + sT_d} \Delta P_{ref}^* \\ \Delta i_{od} = \frac{1}{1 + sT_{in}^p} \left( k_p^p + \frac{k_i^p}{s} \right) (\Delta P_{ref} - \Delta P_{dg}) \\ \Delta P_{dg} = \frac{3 u_{od}}{2} \Delta i_{od} \\ \Delta P_{int} = \frac{\Delta P_{ref} - \Delta P_{dg}}{s} \end{cases} \quad (2)$$

In formula (2), $\Delta P_{ref}^*$ is a difference between reference power and present power of the inverters, $\Delta P_{ref}$ is a difference between actual reference power and the present power of the inverters, $T_d$ is a delay from receipt of a control instruction by the inverters to execution of the control instruction by the inverters, $\Delta i_{od}$ is a difference between a d-axis current component at a present time and a d-axis current component at a previous time of the inverters, $T_{in}^p$ is the time constant of the inner current loop of the active power, $k_p^p$ and $k_i^p$ are a proportional coefficient and an integral coefficient of an outer power loop PI controller respectively, $u_{od}$ is the d-axis component of the output port voltage of the inverters, $\Delta P_{dg}$ is a difference between output power at the present time and output power at the previous time of the inverters, $u_{od}$ is a d-axis component of output port voltage of the inverters, $\Delta P_{int}$ is an integral of a difference between $\Delta P_{ref}$ and $\Delta P_{dg}$, and s is a Laplace operator.

An equivalent mathematical model of the output reactive power of the inverters in the PQ mode can be obtained in the similar way. Because only the active power needs to be changed when the new energy power station participates in primary frequency regulation, only a model for controlling the active power is established in the invention. A state-space model established according to formula (2) may be as follows:

$$\Delta \dot{x}_c^p = A_c^p \Delta x_c^p + B_c^p \Delta u_c^p \quad (3)$$

Wherein, $$\Delta x_c^p = [\Delta P_{dg} \ \Delta P_{int} \ \Delta i_{od} \ \Delta P_{ref}]^T,$$

$$A_c^p = \begin{bmatrix} 0 & 0 & \frac{3}{2} u_{od} & 0 \\ -1 & 0 & 0 & 1 \\ -\frac{k_p^p}{T_{in}^p} & \frac{k_i^p}{T_{in}^p} & -\frac{1}{T_{in}^p} & \frac{k_p^p}{T_{in}^p} \\ -\frac{1}{T_d} & 0 & 0 & 0 \end{bmatrix},$$

$$B_c^p = \begin{bmatrix} 0 \\ 0 \\ 0 \\ -\frac{1}{T_d} \end{bmatrix},$$

$$\Delta u_c^p = [\Delta P_{ref}^*]$$

Formula (3) is discretized to obtain a mathematical model of the active power output by the inverters in a discrete time:

$$x(k+1) = Ax(k) + Bu(k) \quad (4)$$

In formula (4), $x(k) = [\Delta P_{dg}(k) \Delta P_{int}(k) \Delta i_{od}(k) \Delta P_{ref}(k)]^T$, $\Delta P_{dg}(k)$ is a difference between output power at a time k and output power at a previous time of the inverters, $\Delta i_{od}(k)$ is a difference between a d-axis current component at the time k and the d-axis current component at the previous time of the inverters, $\Delta P_{ref}(k)$ is a difference between the actual reference power and the power at the time k of the inverters, $\Delta P_{int}(k)$ is an integral of a difference between $\Delta P_{ref}(k)$ and $\Delta P_{dg}(k)$, $u(k) = [\Delta P_{ref}^*(k)]$, $\Delta P_{ref}^*(k)$ is a difference between the reference power and the power at the time k of the inverters, $$A = e^{A_c^p T_p}, \ B = \int_0^{T_p} e^{A_c^p \tau} B_c^p d\tau,$$

and $T_p$ is a sampling time.

In one embodiment, based on the mathematical model of the active power output by the inverters in the PQ mode, a primary frequency regulation power allocation method based on model predictive control is proposed. For example, if primary frequency regulation is started when a system frequency is lower than a rated frequency, an objective function for predictive control may be expressed as:

$$\min \sum_{j=1}^{N_p} \sum_{i=1}^{N} \lambda_i(k) \Phi_i(k+j|k) \quad (5)$$

In formula (5), $N_p$ is a predictive domain length, N is the number of the power generation units of the new energy power station, $\lambda_i(k)$ is a weight coefficient of an $i^{th}$ power generation unit, $\Phi_i(k) = -b_i \Delta P_i(k), b_i = \{0,1\}$ is a cost function of the $i^{th}$ power generation unit, and $\Delta P_i(k)$ is a power variation of the power generation unit at the time k with respect to a time k−1; $\Phi_i(k+j|k)$ represents a $\Phi_i$ value at a time k+j predicted at the time k.

The objective function expressed by formula (5) is constrained by the following conditions:

$$\lambda_i(k) = C_i(k) \frac{\Delta P_i^{max}}{\Delta P_{total}} \quad (6)$$

$$\Delta P_{total} = \sum_{i=1}^{N} \Delta P_i^{max} \quad (7)$$

$$\sum_{i=1}^{N} P_i(k) = \Delta P \quad (8)$$

$$\Delta P = K \Delta f \quad (9)$$

$$\Delta P_i^{min} \le \Delta P_i(k) \le \Delta P_i^{max}, i = 1, 2 \ldots N \quad (10)$$

$$x(k+1) = Ax(k) + Bu(k) \quad (11)$$

In formula (6), $C_i(k)$ is a confidence of the $i^{th}$ power generation unit at the time k, and an initial value of $C_i(k)$ is 1; $\Delta P_i^{max}$ and $\Delta P_i^{min}$ are respectively an upper limit and a lower limit of the primary frequency regulation predictive values calculated in Step 11, $\Delta P$ is total power required for the new energy power station to participate in primary frequency regulation, $\Delta P_{total}$ is a total predictive value for the new energy power station to participate in primary frequency regulation, $P_i(k)$ is active power of the $i^{th}$ power generation unit at the time k, $\Delta f$ is a system frequency deviation, and K is a primary frequency regulation coefficient of the new energy power station; formula (11) is the mathematical model of the active power output by the inverters and has the same meaning as formula (4). In one embodiment, the optimal control sequences obtained by solving formula (5) are:

$$u^*(k) = [\Delta P_{ref}^*(k|k), \Delta P_{ref}^*(k+1|k), \ldots, \Delta P_{ref}^*(k+N_c|k)] \quad (12)$$

Wherein, $u^*(k)$ is the optimal control sequence at the time k, $N_c$ a control domain length, $\Delta P_{ref}^*(k+i|k), i=1, 2, \ldots N_c$ is a control quantity at a time k+i of the inverters predicted at the time k, and $\Delta P_{ref}^*(k|k)$ is a control quantity at the time k of the inverters.

In practice, the control performance may be affected by the delay of a communication network, so a networked dynamic compensation mechanism for handling the delay of the communication network may be set based on predictive compensation.

So, in Step 13, the optimal control sequences at the different times are marked with time scales, the optimal control sequences are sent to executing devices of the power generation units at the corresponding times, and the executing devices of the power generation units receive the optimal control sequences and determine whether to store or not store the optimal control sequences according to the time scales.

Specifically, on one embodiment, assume a maximum delay of the communication network is not greater than the control domain length $N_c$ in formula (12), the optimal control sequences calculated in Step 12 are packed, the optimal control sequence packet is marked with a time scale through a time synchronization device and is then issued to the executing devices of the corresponding power generation units to be stored, and time scale comparison will be performed by the executing devices of the corresponding power generation units in the subsequent step.

In one embodiment, if the time scales of the optimal control sequences received by the executing devices of the power generation units are less than or equal to the time scales of stored optimal control sequences stored in the executing devices, the received optimal control sequences will not be stored; otherwise, the received optimal control sequences will be stored.

Step 14, the executing devices of the power generation units determine the control quantities to be executed according to optimal control sequences received and stored in the executing devices and the time scales of the optimal control sequences.

In one embodiment, if the time scale of the optimal control sequence received by the executing devices of the power generation units is identical with the time scale of the optimal control sequence stored in the executing devices, it is determined that the communication network is normal, and a first control quantity in the optimal control sequence stored in the executing devices is executed.

In another embodiment, if time scale of the optimal control sequence received by the executing devices of the power generation units is not identical with the time scale of the optimal control sequence stored in the executing devices or the executing devices of the power generation units do not receive the optimal control sequence packet, it is determined that the communication network has a delay. So, in one example, if the optimal control sequence packet in Step 13 is not received at the present time k and assume the optimal control sequence packet stored in the executing device of the $i^{th}$ power generation unit at this time is:

$$u_i^*(k_i) = [\Delta P_{ref,i}^*(k_i|k_i), \Delta P_{ref,i}^*(k_i+1|k_i), \ldots, \Delta P_{ref,i}^*(k_i+N_c|k_i)] \quad (13)$$

A control quantity $\Delta P_{ref,i}^*(k|k_i)$ is performed, wherein $k_i$ is the time scale of the optimal control sequence packet stored in the executing device in the $i^{th}$ power generation unit at the present time k. Assume the maximum delay of the communication network is not greater the control domain length $N_c$ in formula (12), the control quantity $\Delta P_{ref,i}^*(k|k_i)$ exists when the communication network has a delay.

hi another embodiment, if the time scale of the optimal control sequence packet received at the present time k is less than the time scale of the optimal control sequence packet stored in the executing devices and assume $k_i$ is the time scale of the optimal control sequence packet stored in the executing device in the $i^{th}$ power generation unit at the present time k, a control quantity $\Delta P_{ref,i}^*(k|k_i)$ is performed. Assume the maximum delay of the communication network is not greater than the control domain length $N_c$ in formula (12), the control quantity $\Delta P_{ref,i}^*(k|k_i)$ exists when the communication network has a delay.

In another embodiment, if the time scale of the optimal control sequence packet received at the present time k is less than the time scale of the optimal control sequence packet stored in the executing devices and assume $k_r$ is the time scale of the optimal control sequence packet received by in the executing device of the $i^{th}$ power generation unit at the present time k, a control quantity $\Delta P_{ref,i}^{*}(k|k_r)$ is performed. Assume the maximum delay of the communication network is not greater than the control domain length $N_c$ in formula (12), the control quantity $\Delta P_{ref,i}^{*}(k|k_r)$ when the communication network has a delay.

Through the above steps, online allocation and predictive compensation of primary frequency regulation power of the new energy power station can be realized, but the primary frequency regulation effect will be affected when part of the units in the power station malfunction or the active power is limited.

So, according to one embodiment, in Step 12, a primary, frequency regulation power allocation result of the power generation units is determined according to the primary frequency regulation predictive values based on the pre-established inverter active power model, the primary frequency regulation power allocation result is adjusted according to a preset confidence function, and the optimal control sequences of the inverters of the power generation units at different times are determined according to the adjusted primary frequency regulation power allocation result.

Specifically, in one embodiment, the confidence function may be expressed as:

$$C_i(k+1) = 1 - \frac{e_i(k)}{P_i^*(k)}, i = 1, 2, \ldots N \quad (14)$$

Wherein, $C_i(k+1)$ is a confidence function at a time k+1, $P_i^*(k)$ is a power reference value at a time k of an $i^{th}$ power generation unit, and $e_i(k) = |P_i(k) - P_i^*(k)|\delta$ is a power deviation function at the time k of the $i^{th}$ power generation unit, and is defined as:

$$|P_i(k) - P_i^*(k)|_\delta = \begin{cases} |P_i(k) - P_i^*(k)|, & |P_i(k) - P_i^*(k)| > \delta \\ 0, & |P_i(k) - P_i^*(k)| <= \delta \end{cases} \quad (15)$$

Wherein, $\delta$ is a set threshold for preventing a confidence decrease in presence of normal power fluctuations.

According to the confidence function shown by formula (14), if the active power $P_i(k)$ of the $i^{th}$ power generation unit at the time k reaches a set value $P_i^*(k)$, the confidence $C_i(k+1)$ of the $i^{th}$ power generation unit at the time k+1 is 1; if the active power $P_i(k)$ of the $i^{th}$ power generation unit at the time k does not reach the set value $P_i^*(k)$, the confidence of the $i^{th}$ power generation unit will be decreased, and primary frequency regulation power provided by the $i^{th}$ power generation unit will also be decreased; if the active power of the $i^{th}$ power generation unit reaches an upper limit or the power generation unit does not work due to a fault, $C_i(k+1)$ is 0; and as can be known from formula (5), the weight value $\lambda_i(k+1)$ of the $i^{th}$ power generation unit at the time k+1 is 0, so the $i^{th}$ power generation unit will not provide power for primary frequency regulation at this time.

The networked control method for primary frequency regulation of a new energy power station provided by the embodiment in this specification can predict the frequency regulation potential of the new energy power station based on a short-term real-time prediction algorithm, thus solving the problem of poor primary frequency regulation, accuracy caused by uncertainties and fluctuations of the active power of new energy. In addition, during real-time power allocation of the new energy power station participating in primary frequency regulation, a corresponding optimization objective function is designed by taking into account the start-up cost of the power generation units of the new energy power station, so that the problems of low response speed, poor frequency regulation precision and network communication delay of primary frequency regulation in actual projects are solved, and it is ensured that the new energy power station participates in primary frequency regulation economically. Moreover, the output of each power generation unit of the new energy power station for primary frequency regulation is corrected by means of a dynamic weight coefficient based on a confidence function, so the problem of limited power regulation and faults of part of the power generation units of the new energy power station is effectively solved.

Although the invention has been disclosed above with reference to preferred embodiments, these embodiments are not used to limit the invention. All technical solutions obtained based on equivalent substation or transformation should fall within the protection scope of the invention.

What is claimed is:

1. A networked control method for primary frequency regulation of a new energy power station, comprising:
   determining, according to historical operating data of a new energy power station, primary frequency regulation predictive values of power generation units of the new energy power station;
   determining, according to the primary frequency regulation predictive values, optimal control sequences of inverters of the power generation units at different times based on a pre-established inverter active power model, wherein the optimal control sequences comprise multiple control quantities of active power of the inverters;
   marking the optimal control sequences at the different times with time scales, sending the optimal control sequences to executing devices of the power generation units at the corresponding times, receiving the optimal control sequences by the executing devices of the power generation units, and determining whether to store or not store the optimal control sequences according to the time scales; and
   determining, by the executing devices of the power generation units, the control quantities to be executed according to optimal control sequences received and stored in the executing devices and the time scales of the optimal control sequences, and executing the determined control quantities to control the inverters of the power generation units to regulate a frequency of the new energy power station;
   wherein the inverter active power model is established through the following steps:
   establishing an equivalent mathematical model of active power output by the inverters in a PQ mode:

$$\begin{cases} \Delta P_{ref} = \dfrac{1}{1+sT_d}\Delta P_{ref}^* \\ \Delta i_{od} = \dfrac{1}{1+sT_{in}^p}\left(k_p^p + \dfrac{k_i^p}{s}\right)(\Delta P_{ref} - \Delta P_{dg}) \\ \Delta P_{dg} = \dfrac{3u_{od}}{2}\Delta i_{od} \\ \Delta P_{int} = \dfrac{\Delta P_{ref} - \Delta P_{dg}}{s} \end{cases}$$

wherein, $\Delta P_{ref}^*$ is a difference between reference power and present power of the inverters, $\Delta P_{ref}$ is a difference between actual reference power and the present power of the inverters, $T_d$ is a delay from receipt of a control instruction by the inverters to execution of the control instruction by the inverters, $\Delta i_{od}$ is a difference between a d-axis current component at a present time and a d-axis current component at a previous time of the inverters, $T_{in}^P$ is a time constant of an inner current loop of the active power, $k_p^P$ and $k_i^P$ are a proportional coefficient and an integral coefficient of an outer power loop PI controller respectively, $\Delta P_{dg}$ is a difference between output power at the present time and output power at the previous time of the inverters, $u_{od}$ is a d-axis component of output port voltage of the inverters, $\Delta P_{int}$ is an integral of a difference between $\Delta P_{ref}$ and $\Delta P_{dg}$, and s is a Laplace operator;

establishing a state-space model of the active power output by the inverters based on the equivalent mathematical model:

$$\Delta \dot{x}_c^P = A_c^P \Delta x_c^P + B_c^P \Delta u_c^P$$

wherein, $\Delta x_c^P = [\Delta P_{dg} \Delta P_{int} \Delta i_{od} \Delta P_{ref}]^T$, $$A_c^p = \begin{bmatrix} 0 & 0 & \frac{3}{2}u_{od} & 0 \\ -1 & 0 & 0 & 1 \\ -\frac{k_p^p}{T_{in}^p} & \frac{k_i^p}{T_{in}^p} & -\frac{1}{T_{in}^p} & \frac{k_p^p}{T_{in}^p} \\ -\frac{1}{T_d} & 0 & 0 & 0 \end{bmatrix}, B_c^p = \begin{bmatrix} 0 \\ 0 \\ 0 \\ -\frac{1}{T_d} \end{bmatrix}, \Delta u_c^p = [\Delta P_{ref}^*]$$

discretizing $\Delta \dot{x}_c^P = A_c^P \Delta x_c^P + B_c^P \Delta u_c^P$ to obtain a mathematical model of the active power output by the inverters in a discrete time:

$$x(k+1) = Ax(k) + Bu(k)$$

wherein, $x(k) = [\Delta P_{dg}(k) \Delta P_{int}(k) \Delta i_{od}(k) \Delta P_{ref}(k)]^T$, $\Delta P_{dg}(k)$ is a difference between output power at a time k and output power at a previous time of the inverters, $\Delta i_{od}(k)$ is a difference between a d-axis current component at the time k and the d-axis current component at the previous time of the inverters, $\Delta P_{ref}(k)$ is a difference between the actual reference power and the power at the time k of the inverters, $\Delta P_{int}(k)$ is an integral of a difference between $\Delta P_{ref}(k)$ and $\Delta P_{dg}(k)$, $u(k) = [\Delta P_{ref}^*(k)]$, $\Delta P_{ref}^*(k)$ is a difference between the reference power and the power at the time k of the inverters, $$A = e^{A_c^p T_p}, B = \int_0^{T_p} e^{A_c^p \tau} B_c^p d\tau, \text{ and } T_p$$

is a sampling time.

2. The method according to claim 1, wherein the historical operating data comprise one or more of historical active power data in at least 24 hours, light intensity data in at least 24 hours, and wind velocity data in at least 24 hours.

3. The method according to claim 1, wherein the determining, according to the primary frequency regulation predictive values, optimal control sequences of inverters of the power generation units at different times based on a preestablished inverter active power model, comprises:

when primary frequency regulation is started under a condition where a system frequency is lower than a rated frequency, determining, based on the inverter active power model, the optimal control sequences of the inverters of the power generation units at different times by means of an objective function for predictive control, wherein the objective function for predictive control is expressed as:

$$\min \sum_{j=1}^{N_p} \sum_{i=1}^{N} \lambda_i(k) \Phi_i(k+j|k)$$

wherein, $N_p$ is a predictive domain length, N is the number of the power generation units of the new energy power station, $\lambda_i(k)$ is a weight coefficient of an ith power generation unit, $\Phi_i(k) = -b_i \Delta P_i(k), b_i = \{0,1\}$ is a cost function of the ith power generation unit, and $\Delta P_i(k)$ is a power variation of the ith power generation unit at the time k with respect to a time k−1; $\Phi_i(k+j|k)$ represents a $\Phi_i$ value at a time k+j predicted at the time k;

constraints of the objective function are:

$$\lambda_i(k) = C_i(k) \frac{\Delta P_i^{max}}{\Delta P_{total}}$$

$$\Delta P_{total} = \sum_{i=1}^{N} \Delta P_i^{max}$$

$$\sum_{i=1}^{N} P_i(k) = \Delta P$$

$$\Delta P = K \Delta f$$

$$\Delta P_i^{min} \leq \Delta P_i(k) \leq \Delta P_i^{max}, i = 1, 2 \ldots N$$

$$x(k+1) = Ax(k) + Bu(k)$$

wherein, $C_i(k)$ is a confidence of the ith power generation unit at the time k, and an initial value of $C_i(k)$ is 1; $\Delta P_i^{max}$ and $\Delta P_i^{min}$ are an upper limit and a lower limit of the primary frequency regulation predictive values respectively, $\Delta P$ is total power required for the new energy power station to participate in primary frequency regulation, $\Delta P_{total}$ is a total predictive value for the new energy power station to participate in primary frequency regulation, $P_i(k)$ is active power of the ith power generation unit at the time k, $\Delta f$ is a system frequency deviation, and K is a primary frequency regulation coefficient of the new energy power station; $x(k+1) = Ax(k) + Bu(k)$ is the active power model of the inverters in the discrete time;

the optimal control sequences are:

$$u^*(k) = [\Delta P_{ref}^*(k|k), \Delta P_{ref}^*(k+1|k), \ldots, \Delta P_{ref}^*(k+N_c|k)]$$

wherein, $u^*(k)$ is the optimal control sequence at the time k, $N_c$ is a control domain length, $\Delta P_{ref}^*(k+i|k), i=1, 2, \ldots N_c$ is a control quantity at a time k+i of the inverters predicted at the time k, and $\Delta P_{ref}^*(k|k)$ is a control quantity at the time k of the inverters.

4. The method according to claim 1, wherein the receiving the optimal control sequences by the executing devices of the power generation units and the determining whether to store or not store the optimal control sequences according to the time scales, comprise:

if the time scales of the optimal control sequences received by the executing devices of the power generation units are less than or equal to the time scales of stored optimal control sequences stored in the executing devices, not storing the received optimal control sequences;

otherwise, storing the received optimal control sequences.

5. The method according to claim 1, wherein the determining, by the executing devices of the power generation units, the control quantities to be executed according to optimal control sequences received and stored in the executing devices and the time scales of the optimal control sequences, comprises: if the time scale of the optimal control sequence received by the executing devices of the power generation units at the present time is identical with the time scale of the optimal control sequence stored in the executing devices, executing a first control quantity in the optimal control sequence stored in the executing devices.

6. The method according to claim 1, wherein the determining, by the executing devices of the power generation units, the control quantities to be executed according to optimal control sequences received and stored in the executing devices and the time scales of the optimal control sequences, comprises:

assuming an optimal control sequence packet stored in the executing device of the ith power generation unit at the present time k is:

$$u_i^*(k_l) = [\Delta P_{ref,i}^*(k_l|k_l), \Delta P_{ref,i}^*(k_l+1|k_l), \ldots, \Delta P_{ref,i}^*(k_l+N_c|k_l)]$$

wherein, $k_l$ is a time scale of the optimal control sequence packet stored in the executing device in the ith power generation unit at the present time k, $\Delta P_{ref,i}^*(k_l+i|k_l)$, i=1, 2, ... $N_c$ is a control quantity at a time $k_l+i$ of the ith inverter predicted at a time $k_l$, and $\Delta P_{ref,i}^{*1\ (k}{}_l|k_l)$ is a control quantity at the time $k_l$ of the ith inverter;

if the executing device of the ith power generation unit does not receive an optimal control sequence packet at the present time k, executing a control quantity $\Delta P_{ref,i}^*(k|k_l)$, wherein $\Delta P_{ref,i}^*(k|k_l)$ is the control quantity at the present time k of the ith inverter predicted at the time $k_l$; or if the time scale of the optimal control sequence packet received by the executing device of the ith power generation unit at the present time k is less than $k_l$, executing the control quantity $\Delta P_{ref,i}^*(k|k_l)$.

7. The method according to claim 6, further comprising:

assuming an optimal control sequence packet $u_i^*(k_r)$ received by in the executing device of the ith power generation unit at the present time k is:
$u_i^*(k_r) = [\Delta P_{ref,i}^*(k_r|k_r), \Delta P_{ref,i}^*(k_r+1|k_r), \ldots, \Delta P_{ref,i}^*(k_r+N_c|k_r)]$, wherein $k_r$ is a time scale of the optimal control sequence packet $u_i^*(k_r)$ received by in the executing device of the ith power generation unit at the present time k, $\Delta P_{ref,i}^*(k_r+i|k_r)$, i=1, 2, ... $N_c$ is a control quantity at a time $k_r+i$ of the ith inverter predicted at a time $k_r$, and $\Delta P_{ref,i}^*(k_r|k_r)$ is a control quantity at the time $k_r$ of the ith inverter;

if the time scale $k_r$ of the optimal control sequence packet received by the executing device of the ith power generation unit at the present time k is greater than $k_l$, executing a control quantity $\Delta P_{ref,i}^*(k|k_r)$, wherein $\Delta P_{ref,i}^*(k|k_r)$ is the control quantity at the present time k of the ith inverter predicted at the time $k_r$.

8. The method according to claim 1, wherein the determining, according to the primary frequency regulation predictive values, optimal control sequences of inverters of the power generation units at different times based on a pre-established inverter active power model, further comprises:

determining, according to the primary frequency regulation predictive values, a primary frequency regulation power allocation result of the power generation units based on the pre-established inverter active power model, adjusting the primary frequency regulation power allocation result according to a preset confidence function, and determining the optimal control sequences of the inverters of the power generation units at different times according to the adjusted primary frequency regulation power allocation result.

9. The method according to claim 8, wherein a mathematical expression of the confidence function is:

$$C_i(k+1) = 1 - \frac{e_i(k)}{P_i^*(k)}, i = 1, 2, \ldots N$$

wherein, $C_i(k+1)$ is a confidence function at a time k+1, $P_i^*(k)$ is a power reference value at a time k of an ith power generation unit, and $e_i(k) = |P_i(k) - P_i^*(k)|_\delta$ is a power deviation function at the time k of the ith power generation unit, and is defined as:

$$|P_i(k) - P_i^*(k)|_\delta = \begin{cases} |P_i(k) - P_i^*(k)|, & |P_i(k) - P_i^*(k)| > \delta \\ 0, & |P_i(k) - P_i^*(k)| <= \delta \end{cases}$$

wherein, $\delta$ is a set threshold for preventing a confidence decrease in presence of normal power fluctuations, and $P_i(k)$ is active power of the ith power generation unit at the time k.

* * * * *